(12) United States Patent
Kumar

(10) Patent No.: US 7,752,285 B2
(45) Date of Patent: Jul. 6, 2010

(54) SHORTCUT SETS FOR CONTROLLED ENVIRONMENTS

(75) Inventor: Amit Kumar, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 188 days.

(21) Appl. No.: 11/924,863

(22) Filed: Oct. 26, 2007

(65) Prior Publication Data

US 2009/0077200 A1 Mar. 19, 2009

Related U.S. Application Data

(60) Provisional application No. 60/973,109, filed on Sep. 17, 2007.

(51) Int. Cl.
*G06F 15/13* (2006.01)
(52) U.S. Cl. .................. 709/219; 709/203; 709/224; 709/225; 707/5; 707/101
(58) Field of Classification Search .......... 709/203, 709/219, 224, 225; 707/5, 101
See application file for complete search history.

(56) References Cited

U.S. PATENT DOCUMENTS

| | | | |
|---|---|---|---|
| 6,006,224 A | 12/1999 | McComb et al. | |
| 6,085,186 A | 7/2000 | Christianson et al. | |
| 6,243,071 B1 | 6/2001 | Shwarts et al. | |
| 6,490,579 B1 | 12/2002 | Gao et al. | |
| 6,772,150 B1 | 8/2004 | Whitman et al. | |
| 6,804,677 B2 * | 10/2004 | Shadmon et al. | 707/101 |
| 7,035,864 B1 | 4/2006 | Ferrari et al. | |
| 7,168,034 B2 | 1/2007 | Hennings et al. | |
| 7,209,915 B1 | 4/2007 | Taboada et al. | |
| 2002/0040389 A1 * | 4/2002 | Gerba et al. | 709/219 |
| 2002/0073088 A1 | 6/2002 | Beckmann et al. | |

(Continued)

FOREIGN PATENT DOCUMENTS

| | | |
|---|---|---|
| WO | WO 98/12881 A2 | 3/1998 |
| WO | WO 01/53970 A2 | 7/2001 |
| WO | WO 01/57725 A2 | 8/2001 |

OTHER PUBLICATIONS

"Notification of Transmittal of the International Search Report and the Written Opinion of the International Searching Authority, or the Declaration" received in International application No. PCT/US2008/076561 received 2/16/09 (4 pages).

(Continued)

*Primary Examiner*—Jinsong Hu
(74) *Attorney, Agent, or Firm*—Hickman Palermo Truong & Becker LLP

(57) ABSTRACT

A method and apparatus for shortcut sets to data sources, such as web sites, is disclosed. The shortcut sets may be associated with a controlled environment. A controlled environment might be a home, corporation, business, etc. As an example, an information technology (IT) manager configures shortcuts for the employees of the company. As another example, a family member configures shortcuts that are common to all family members, when at home. A user may enter a shortcut into a search box of a web browser to be directed to a data source. If the shortcut indicates a search at the data source is desired, then a search is automatically performed at the data source.

17 Claims, 3 Drawing Sheets

U.S. PATENT DOCUMENTS

| | | | |
|---|---|---|---|
| 2003/0065639 | A1 | 4/2003 | Fiennes et al. |
| 2004/0064447 | A1 | 4/2004 | Simske et al. |
| 2004/0083205 | A1 | 4/2004 | Yeager |
| 2004/0162757 | A1 | 8/2004 | Pisaris-Henderson et al. |
| 2005/0192946 | A1 | 9/2005 | Lu et al. |
| 2007/0061602 | A1* | 3/2007 | Matsuda ..................... 713/300 |
| 2007/0124471 | A1* | 5/2007 | Harada et al. ............... 709/225 |
| 2008/0319976 | A1* | 12/2008 | Morris et al. .................. 707/5 |

OTHER PUBLICATIONS

Current Claims of International application No. PCT/US2008/076561, Apr. 2009 (5 pages).

Japanese Office Action received in 2006-509740 dated Jan. 4, 2010 (7 pages).

Current claims of 2006-509740 (2 pages).

Supplemental European Search Report received in European Application No. 04758906.4 dated Jan. 7, 2010 (3 pages).

Glover, E. et al., "Architecture of a MetaSearch Engine That Supports User Information Needs" Proceedings of the 8$^{th}$ Int'l Conf. On Information Knowledge Mgmt. New York Nov. 2, 1999, XP000895328 (pp. 210-216).

Manber, U. et al., "The Search Broker" The University of Arizona Dec. 1, 1997, XP002560216 retrieved from the Internet: < URL:http://reference.kfupm.edu.sa/content/s/e/the_search_broker_56366 > retrieved on Dec. 14, 2009 (10 pages).

* cited by examiner

SHORTCUT SETS FOR CONTROLLED ENVIRONMENTS

RELATED APPLICATION

This application claims benefit of Provisional Appln. 60/973,109, filed Sep. 17, 2007, the entire contents of which is hereby incorporated by reference as if fully set forth herein, under 35 U.S.C. §119(e).

FIELD OF THE INVENTION

The present invention relates to computer systems, and more particularly to providing user shortcuts to data sources and to searches of data sources.

BACKGROUND

Content retrieval systems allow a user to make a request for content and receive content related to the request. One example of a content retrieval system is the Internet. If the user desires to access a specific web page on the Internet, typically a user enters an address (e.g., a Uniform Resource Locator (URL)) into a web browser in order to receive a web page corresponding to the URL.

In some cases, the user does not desire the content of a specific web page, but is interested in searching for content. To search for content on the Internet, a user typically uses a web browser to first access a search engine, which provides the web browser with an interface to submit search criteria to the search engine. The interface displays the search results returned by the search engine. The user may desire the search to take place over the majority of the Internet. However, often the user desires the search to take place over a particular data source, such as a web site.

Thus, even when performing a search, the user often focuses on a particular data source. There are techniques, such as bookmarks, that provide a relatively quick means to access a particular website. However, users need to establish bookmarks and manage them. Oftentimes, the list of bookmarks becomes so long that it is time consuming for the user to scroll down a list of bookmarks to the desired bookmark. Moreover, typical bookmarks do not automatically initiate a search of the bookmarked website.

Improved techniques are needed for allowing users to navigate to particular data sources, such as websites. Moreover, improved techniques are needed for users to search particular data sources.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein for providing a user with shortcuts to particular data sources and/or shortcuts to perform a search at particular data sources. In one embodiment, the user submits a shortcut into a search box of a web browser that is interfacing with a search engine. The search engine determines a website for the shortcut and directs the web browser to the website. For example, if the user types "!my" in the search box, the user's web browser might be directed to the website having the URL "my.yahoo.com." If the submitted shortcut indicates a search is desired, then the search engine causes the web browser to automatically initiate a search at the website. For example, if the user types "!wsf" in the search box, the user's web browser might be directed to initiate a search, at a weather website, for the weather forecast for San Francisco.

In one embodiment, all users in a controlled environment automatically have access to the same set of controlled-environment shortcuts, without the users having to set up the shortcuts. The controlled environment might be a home or corporation. As an example, an information technology (IT) manager configures shortcuts for the employees of the company. As another example, a family member configures shortcuts that are common to all family members, when at home. However, when the user is at a client device outside of the controlled environment, the shortcuts for the controlled environment do not apply.

In another embodiment, all users associated with a particular online social group automatically have access to the same set of user-group shortcuts, without the users having to set up the shortcuts. For example, all users that belong to an online group that is interested in automobiles share a set of shortcuts.

Note that the user does not need to configure the shortcut sets themselves. Note also that the shortcut sets for a user can be specific to each different controlled environment. Thus, as the user migrates from home to work to an Internet cafe, the user acquires different shortcut sets. Also note that a user may be associated with many different shortcut sets. For example, a user may be a member of a family, a workgroup, one or more social groups, etc. The shortcut sets associated with a particular user are the intersection of various shortcut sets, in one embodiment.

System Overview

Figure 1:
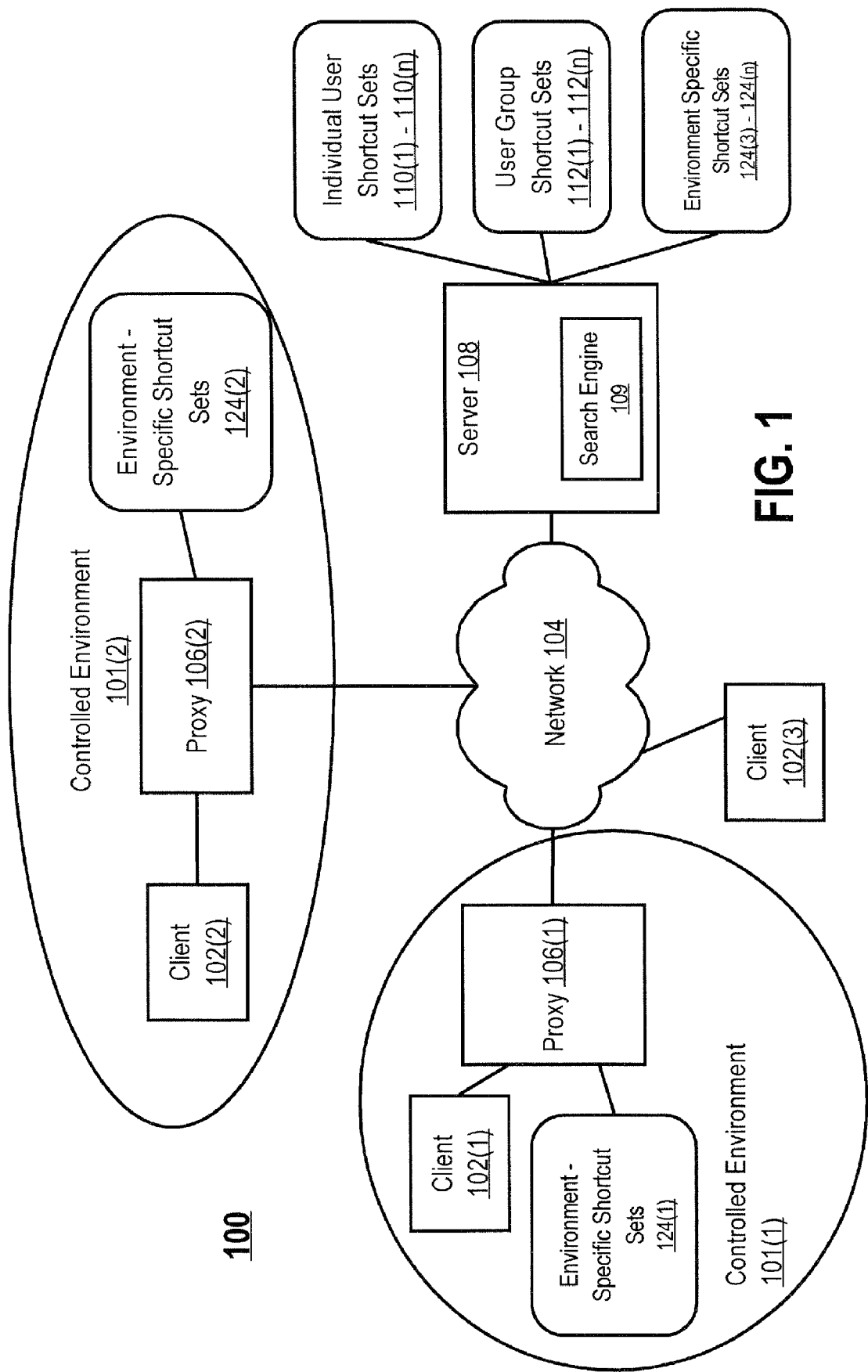
FIG. 1 is a system for shortcut sets for controlled environments and user groups, in accordance with an embodiment of the present invention.

FIG. 1 is a system 100 for shortcut sets for controlled environments and user groups, in accordance with an embodiment of the present invention. A server 108 has access to number of different shortcut sets, which it uses to provide a user at a client 102 with a shortcut to data source, such as a website. Proxies 106(1), 106(2) have environment specific_ shortcut sets 124(1) and 124(2), respectively, which the proxies 106(1), 106(2) use to provide a shortcut to a client 102(1), 102(2) in their respective environment.

When a user sends a request to the server 108, the server 108 parses the request to determine if the request is intended to trigger a request for a shortcut. The request may be submitted in a web browser that is interfacing with the server 108, although a web browser is not required. In one embodiment, the request is a search query intended for a search engine 109. As an example, a special character such as "!" at the beginning of a search query can be used to indicate that a shortcut is requested. If the request is intended to request a shortcut, the server 108 extracts a hint token from the request. The server 108 consults one or more of the individual shortcut sets 110(1)-110(n), user group shortcut sets 112(1)-112(n), or environment specific shortcut sets 124(3)-124(n) to determine whether a shortcut exists for the hint token. If so, the server 108 directs the client 102 to a data source (e.g., web site) associated with the hint token. In one embodiment, the server 108 directs the client 102 to initiate a search at the data source associated with the hint token.

The proxies 106 are also able to provide shortcuts to clients 102 in their controlled environments 101 by consulting the environment specific shortcuts sets 124. Typically, if a proxy 106 has an environment specific shortcut set 124, then the server 108 does not have environment specific shortcut set 124 for that controlled environment. In other words, an environment specific shortcut set 124 for a particular controlled environment 101 could be located at either a proxy 106 or the server 108, but does not have to be at both.

Controlled Environment

As used herein, the term "controlled environment" means any set of electronic devices under common administration. The environment may include electronic devices that belong to a given environment. The electronic devices may or may not be use the same hardware or run the same software. Examples of electronic devices includes, but is not limited to, a web-enabled cellular telephone, a web-enabled personal digital assistant, a server running a particular operating system (e.g., Linux, Solaris), a personal computer running the Windows® operating system, etc.

The controlled environment may have a device that controls access to the environment. In one embodiment, the controlled environment has a proxy with a firewall to perform the access control. An administrator for the controlled environment may control what software is loaded on the clients. An example of a controlled environment is a home, where the administrator may be any resident thereof, and the end users are the family members. Another example of a controlled environment is a corporation, where the administrator is the information technology (IT) manager, and the end users are employees of the company. Still another example of a controlled environment is a business, such as an Internet café, where the administrator may be the proprietor, and the end users are customers.

The administrator establishes a set of shortcuts for all clients 102 in the controlled environment 101, in one embodiment. The administrator may store the environment specific shortcut set 124 at a proxy 106 or provide the environment specific shortcut set 124 to the server 108.

Shortcut Sets

The shortcut sets contain hint tokens associated with data sources. As previously discussed, the hint token may be taken from a query sent from the client 102 to the server 108. The data source may be identified by a URL or the like. However, the data source is not limited to being identified by a URL. As used herein, the term data source includes any data source that is available to the client 102. The server 108 does not need to have access to the data source. In a controlled environment, the data source might be a particular database or directory. As a particular example, the data source might be a directory on a computer database, such as "H:\Yahoo\employees". Thus, by submitting the hint token associated with that data source, along with a search term, the user might search over all files in a company directory named "Yahoo\employees".

A family shortcut set is an example of a shortcut set in a controlled environment 101 of a home. The family shortcut set might contain hint tokens of "photos", "ftpserver", "bank", etc. Assume that a website hosts family photographs and that the shortcut "photo" directs the client to that website. All the family members are then able type "!photos" into a search query box (for a particular search engine) to get directed to the website with family photos. A similar principle applies to the other hint tokens.

The family members do not have to configure the shortcuts themselves. In other words, each family member does not need to log into an account that is associated with the server 108 and set up the shortcut. The family members do not need to set up bookmarks and do not have the clutter of yet another bookmark in their bookmark list. Note that different family members having different computers and different user accounts with the server 108 share the family shortcuts set.

As another example, the shortcut set might apply to a controlled environment within a corporation. A "corporate shortcut set" might contain hint tokens of "intranet, "hr", "directory". Employees are able to type in "!directory John Doe" to search the company directory for the employee "John Doe", without having to configure such a shortcut themselves. Also note that the same hint token applies regardless of which client 102 within the controlled environment (e.g., 101(1)) the user is currently using, even if the user is not logged in using their own user identifier. However, outside of the controlled environment 101(1) the corporate shortcut set does not apply.

User Groups

This system 110 also provides shortcuts based on user groups of which the user is a member. For example, if a particular user belongs to a group of automobile enthusiasts, a group administrator (or owner) can set up shortcuts for use by the automobile enthusiast group. Note that a user group shortcut set 112 applies to all users in a given group, whereas an individual user shortcut set 110 applies to a particular user.

Note that the user does not need to be in a controlled environment 101 for a user group shortcut set to apply. Assume that a user is a member of a user group having a user group shortcut set 112 containing the hint token "sc-jobs". If the user is at client 102(3) and enters "!sc-jobs" in a request box of a web browser interfacing with the server 108, the server 108 will consult the user group shortcuts set 112 to find a data source associated with the hint token "sc-jobs". The server 108 directs the client 102(3) to a data source corresponding to the shortcut "sc-jobs", as configured by the group administrator.

Process Flow

Figure 2:
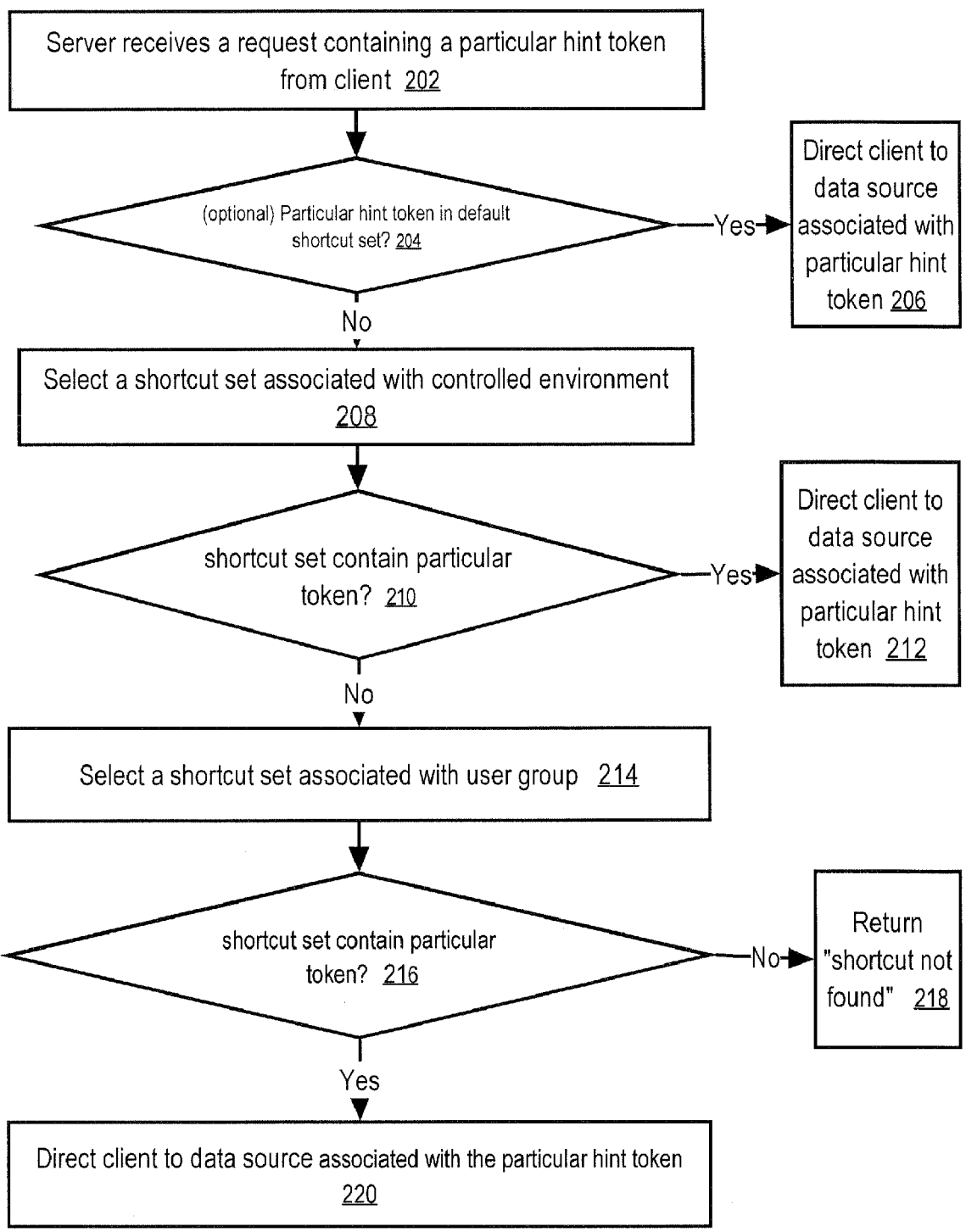
FIG. 2 is a flowchart of a process for shortcut sets for controlled environments and user groups, in accordance with an embodiment of the present invention.

FIG. 2 is a flowchart of a process 200 for shortcut sets for controlled environments and user groups, in accordance with an embodiment of the present invention. Process 200 describes a particular order in which various shortcut sets are accessed. The shortcut sets may be accessed in any order. Moreover, not all of the shortcut sets need to be used.

In step 202, the server 108 receives a request from one of the clients 102. The request may or may not be passed via a proxy 106. In one embodiment, the request is a search query. The request contains a particular hint token that identifies the shortcut requested by the user at the client 102.

In step 204, the server 108 determines whether the particular hint token is in a default shortcut set. The default shortcut set is an individual user shortcut set 110, in one embodiment. Thus, the server 108 identifies a user that is using the client 102 and looks for the particular hint token in the user shortcut set 110, in one embodiment. The server 108 identifies the user based on a user ID currently associated with the web browser that sent the request, in one embodiment. For example, a user might login to the server 108, thus providing the user ID.

If the particular hint token is found in the user shortcut set 110, then the server 108 directs the client 102 to the data source that is associated with the particular token in the user shortcut set 110, in step 206. In one embodiment, the server 108 sends a re-direct message to the client 102 to direct the client 102 to the data source.

In one embodiment, the server 108 causes the client 102 to initiate a search at the data source. In this search embodiment, the server 108 may form a string that allows the client 102 to initiate the search. For example, if the hint token is "!wmv", then a string such as "weather.yahoo.com/forecast/USCA0746.html" might be appropriate to direct the client 102 to initiate a search for weather for Mountain View, Calif.

If the particular hint token is not in the default shortcut set, then the server 108 may select one of the environment-specific shortcut sets 124(3)-124(n), in step 208. The proxy 106 passes a proxy ID to the server 108 to assist the server 108 in the selection, in one embodiment. However, the server 108 does not have environment-specific shortcut set 124(3)-124(n), in one embodiment. In one embodiment, the proxy 106 in a controlled environment 101 has access to environment specific shortcuts 124. An embodiment in which the proxy 106 directs the client 102 to the data source is discussed below.

In step 210, the server 108 searches for the particular hint token in the selected environment specific shortcut set (e.g., 124(3)). If the particular hint token is found, the server 108 directs the client 102 to the data source associated with the particular hint token.

If the particular hint token is not in the environment specific shortcut set 124(3), then the server 108 may select one of the user group shortcut sets 112(1)-112(n), in step 214. The server 108 identifies what user groups the user is associated with and selects a user group shortcut set 112 for one or more of the user groups. In step 216, the server 108 searches for the particular hint token in the selected user group shortcut set(s) 112. If the particular hint token is found, the server 108 directs the client 102 to the data source associated with the particular hint token.

If the server 108 does not find the hint token in any of the shortcut sets, then the server 108 returns a "shortcut not found" message, in step 218. In one embodiment, this message is returned to and processed by a proxy 106. In another embodiment, this message is returned to and processed by the client 102.

Proxy Shortcut Flow

As previously discussed, a proxy 106 has access to environment specific shortcut sets 124, in one embodiment. In this embodiment, the proxy 106 examines the previously discussed response from the server 108 to determine whether the proxy 106 should look for a shortcut in the environment specific shortcut set 124. For example, if the server 108 does not find a suitable shortcut in an individual user shortcut set 110 or a user group shortcut set 112, or environment specific shortcut set 124, then the server 108 may return a "shortcut not found" message. The proxy 106 responds to this message by searching its environment specific shortcut set 124 and directing the client 102 to the data source that is associated with the particular hint token.

Hardware Overview

Figure 3:
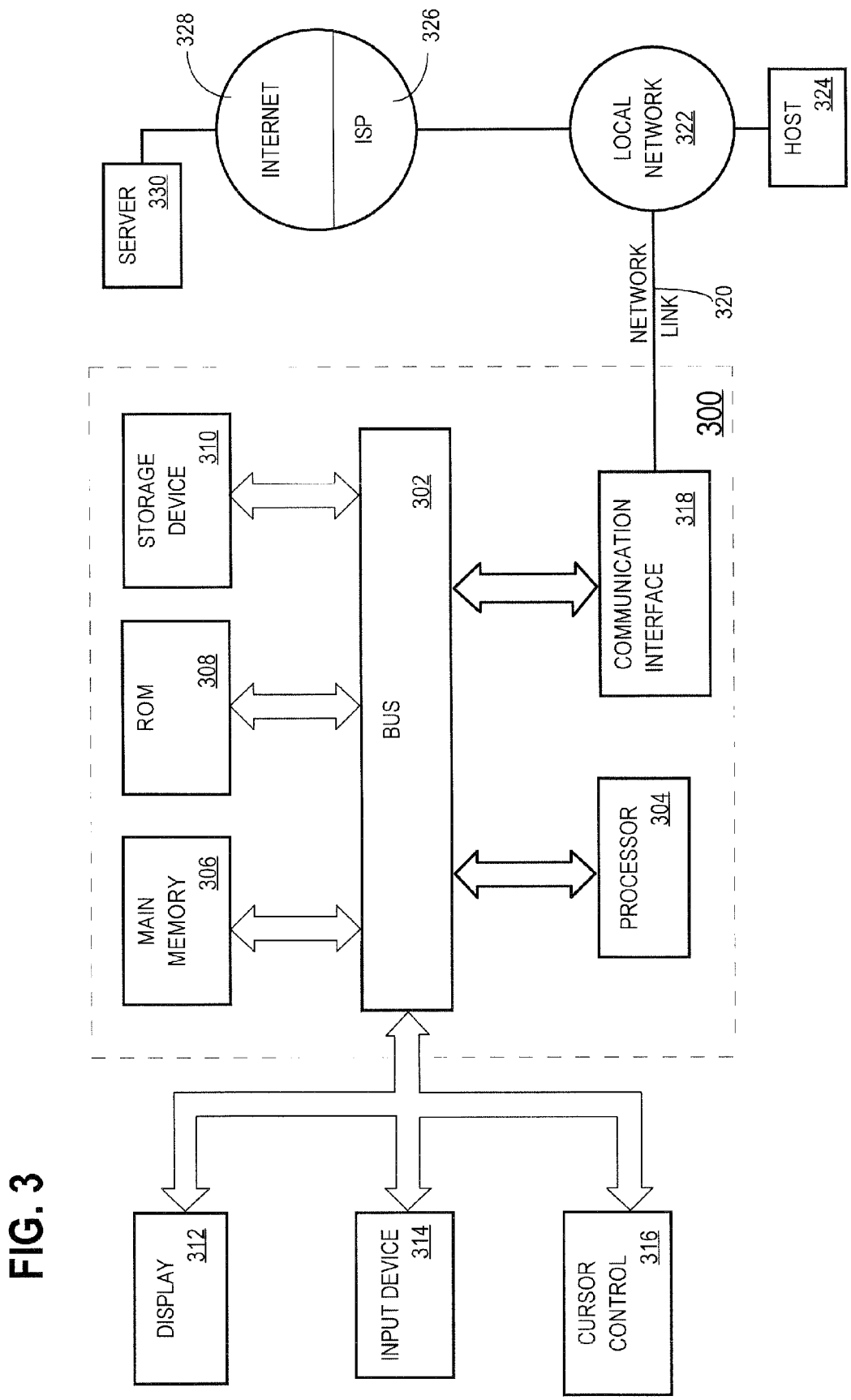
FIG. 3 is a block diagram that illustrates a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine implemented method comprising:
   maintaining, in storage, a plurality of shortcut sets;
   wherein each shortcut set of the plurality of shortcut sets contains associations between one or more hint tokens and one or more data sources;
   receiving at a server that includes one or more processors, from a client, a request containing a particular hint token;
   identifying, by the server, an environment to which the client belongs;
   from the plurality of shortcut sets, the server selecting a shortcut set that is specifically associated with the environment, wherein each shortcut set contains hint tokens associated with data sources;
   determining, by the server, whether the selected shortcut set contains the particular hint token; and
   in response to determining that the selected shortcut set contains the particular hint token, the server directing the client to a data source associated, within the selected shortcut set, with the particular hint token.

2. The method of claim 1, wherein the shortcut set is a first shortcut set and further comprising:
   in response to determining that the selected shortcut set does not contain the particular hint token with an associated data source, performing the following steps:
     selecting a second shortcut set based on further information associated with the request;
     determining whether the second shortcut set contains the particular hint token with an associated data source; and
     in response to determining that the second shortcut set contains the particular hint token with an associated data source, directing the client to a website corresponding to the data source.

3. The method of claim 1, wherein the step of directing the client to a data source comprises directing the client to initiate a search at the data source associated with the particular hint token.

4. The method of claim 1, wherein the step of directing the client to a data source comprises directing the client to a website associated with the data source.

5. The method of claim 1, further comprising the step of:
in response to receiving input from an administrator of the environment, establishing the shortcut set that is specifically associated with the environment.

6. The method of claim 1, wherein identifying the environment to which the client belongs comprises receiving, from a proxy device within the environment, information that uniquely identifies the environment.

7. An apparatus comprising:
a processor; and
a computer-readable medium communicatively coupled to the processor, said computer readable medium carrying one or more sequences of instructions, which when executed by one or more processors causes the one or more processors to perform the steps of:
maintaining, in storage, a plurality of shortcut sets;
wherein each shortcut set of the plurality of shortcut sets contains associations between one or more hint tokens and one or more data sources;
receiving at a server, from a client, a request containing a particular hint token;
identifying, by the server, an environment to which the client belongs;
from the plurality of shortcut sets, the server selecting a shortcut set that is specifically associated with the environment, wherein each shortcut set contains hint tokens associated with data sources;
determining, by the server, whether the selected shortcut set contains the particular hint token; and
in response to determining that the selected shortcut set contains the particular hint token, the server directing the client to a data source associated, within the selected shortcut set, with the particular hint token.

8. The apparatus of claim 7, wherein the one or more sequences of instructions, which when executed by one or more processors causes the one or more processors to perform the step of directing the client to a data source comprise one or more sequences of instructions, which when executed by one or more processors causes the one or more processors to perform the step of directing the client to initiate a search at the data source.

9. The apparatus of claim 7, wherein the one or more sequences of instructions, which when executed by one or more processors causes the one or more processors to perform the step of directing the client to a data source comprise one or more sequences of instructions, which when executed by one or more processors causes the one or more processors to perform the step of directing the client to a website associated with the data source.

10. The apparatus of claim 7, further comprising one or more sequences of instructions, which when executed by one or more processors causes the one or more processors to perform the step of:
in response to receiving input from an administrator of the environment, establishing the shortcut set that is specifically associated with the environment.

11. The apparatus of claim 7, wherein the one or more sequences of instructions, which when executed by one or more processors causes the one or more processors to perform the step of identifying the environment to which the client belongs comprise one or more sequences of instructions, which when executed by one or more processors causes the one or more processors to perform the step of receiving, from a proxy device within the environment, information that uniquely identifies the environment.

12. A machine-readable storage medium storing instructions which, when executed by one or more processors, cause the one or more processors to perform certain steps including:
maintaining, in storage, a plurality of shortcut sets;
wherein each shortcut set of the plurality of shortcut sets contains associations between one or more hint tokens and one or more data sources;
receiving at a server that includes one or more processors, from a client, a request containing a particular hint token;
identifying, by the server, an environment to which the client belongs;
from the plurality of shortcut sets, the server selecting a shortcut set that is specifically associated with the environment, wherein each shortcut set contains hint tokens associated with data sources;
determining, by the server, whether the selected shortcut set contains the particular hint token; and
in response to determining that the selected shortcut set contains the particular hint token, the server directing the client to a data source associated, within the selected shortcut set, with the particular hint token.

13. The machine-readable storage medium of claim 12, wherein the shortcut set is a first shortcut set and further storing instructions which, when executed by one or more processors, cause the one or more processors to perform certain steps including:
in response to determining that the selected shortcut set does not contain the particular hint token with an associated data source, performing the following steps:
selecting a second shortcut set based on further information associated with the request;
determining whether the second shortcut set contains the particular hint token with an associated data source; and
in response to determining that the second shortcut set contains the particular hint token with an associated data source, directing the client to a website corresponding to the data source.

14. The machine-readable storage medium of claim 12, wherein the step of directing the client to a data source comprises directing the client to initiate a search at the data source associated with the particular hint token.

15. The machine-readable storage medium of claim 12, wherein the step of directing the client to a data source comprises directing the client to a website associated with the data source.

16. The machine-readable storage medium of claim 12, further storing instructions which, when executed by one or more processors, cause the one or more processors to perform certain steps including:
in response to receiving input from an administrator of the environment, establishing the shortcut set that is specifically associated with the environment.

17. The machine-readable storage medium of claim 12, wherein identifying the environment to which the client belongs comprises receiving, from a proxy device within the environment, information that uniquely identifies the environment.

* * * * *